United States Patent [19]
Unuvar et al.

[11] Patent Number: 5,835,877
[45] Date of Patent: Nov. 10, 1998

[54] AUTOMATIC SPEED CONTROL WITH LASH COMPENSATION

[75] Inventors: Lisa Marie Unuvar, Flint; Susan Jean Lane, Clarkston, both of Mich.

[73] Assignee: General Motors Corporation, Detroit, Mich.

[21] Appl. No.: 755,193

[22] Filed: Nov. 25, 1996

[51] Int. Cl.$^6$ .............................. G06F 7/00; G06F 17/00
[52] U.S. Cl. .......................... 701/93; 701/110; 123/352; 123/400; 123/402
[58] Field of Search .............................. 701/93, 102, 103, 701/104, 105, 110, 96; 123/352, 339.1, 399, 400, 402

[56] References Cited

U.S. PATENT DOCUMENTS

| | | | |
|---|---|---|---|
| 4,885,692 | 12/1989 | Kurihara et al. | 701/97 |
| 4,928,780 | 5/1990 | Tada | 180/179 |
| 5,521,825 | 5/1996 | Unuvar et al. | 701/36 |
| 5,680,024 | 10/1997 | Ehle et al. | 123/361 |

FOREIGN PATENT DOCUMENTS

WO 93/02886   2/1993   WIPO .

*Primary Examiner*—Jacques H. Louis-Jacques
*Assistant Examiner*—Gertrude Arthur
*Attorney, Agent, or Firm*—Michael J. Bridges

[57] ABSTRACT

Mechanical lash in a cruise control system including a cruise control actuator linked to an engine intake air valve through a cruise cable assembly is automatically measured and stored for use in cruise control operations. The cruise control actuator is driven from a base position along a position schedule while an engine parameter responsive to change in intake air valve position is monitored for any significant parameter change indicating movement of the intake air valve in response to the actuator movement. The amount of actuator movement required before any significant change occurs in the engine parameter is stored as representing the mechanical lash. Cruise control commands are augmented by the learned mechanical lash before being applied to the cruise control actuator.

16 Claims, 3 Drawing Sheets

AUTOMATIC SPEED CONTROL WITH LASH COMPENSATION

TECHNICAL FIELD

This invention relates to automatic speed control for transportation vehicles and, more particularly, to a method for learning and compensating cruise control system mechanical lash.

BACKGROUND OF THE INVENTION

Cruise control systems for transportation vehicles, such as automotive vehicles and motorcycles, typically include a cruise control actuator which is mechanically linked to at least one intake air valve of an engine to override the position of the valve and vary engine output in direction to minimize a difference between the traveling rate of the vehicle and a target traveling rate set by a vehicle operator. The mechanical linkage between the cruise control actuator and the intake air valve includes a mechanical cable in tension between the actuator and the intake air valve. Controlled movement of the actuator extends or retracts the cable, increasing or restricting the degree of opening of the intake air valve to vary the airflow rate into the engine. The cruise control actuator is commonly positioned in a remote location that offers a relatively forgiving operating environment. The remote location may be a significant distance away from the intake air valve. The mechanical cable may be designed to extend over the distance between the cruise control actuator and the intake air valve, or may be designed to extend over a portion of the distance, with a supplemental cable and an adjustment mechanism attached to the mechanical cable to take up the remaining distance.

To account for manufacturing tolerance stackup in the mechanical linkage between the cruise control actuator and the engine intake air valve, extra length is designed into the cable or the supplemental cable, or both, so, over a number of produced vehicles, the mechanical linkage does not fall short of the required distance. When the system is assembled, such a cable having additional length may not be in tension between the cruise control actuator and the engine intake air valve, resulting in mechanical lash. Until the mechanical lash is taken up through controlled movement of the cruise control actuator, there will be no corresponding movement of the intake air valve. The mechanical lash creates a significant control difficulty in that it cannot be assumed that a controlled movement of the cruise control actuator will result in a corresponding movement of the intake air valve. Cruise control system response time may be noticeably increased as the system may not be able to directly provide a desired intake air valve position, but rather may have to reach the position iteratively.

To minimize the effect of such mechanical lash, lash adjustment mechanisms have been added to cruise control systems, increasing system cost and complexity. In the described cruise control systems having a supplemental cable and adjustment mechanism, the adjustment mechanism may include a manual lash adjustment feature for taking up any mechanical lash in the system, increasing system cost and complexity. The adjustment mechanism, such as mechanism 26 schematically illustrated in FIG. 1, may take the form of a slideable bracket which, during an assembly process, is manually slid along mechanical cable 22 or supplemental cable 28 to a tension position and is then released to lock into place. The mechanical cable, linked from the mechanism 26 to at least one intake air valve 12 of engine 10, as well as the supplemental cable 28, linked between the mechanism 26 and cruise control actuator 30, should then be in tension, allowing for direct correspondence between actuator 30 motion and intake air valve 12 motion.

The process of setting the lash adjustment mechanism adds to assembly time and is prone to error. The lash adjustment mechanism, like any mechanical device, is subject to failure. Any error in positioning of the mechanism and any mechanism failure may result in uncompensated mechanical lash and reduced system performance. In motorcycle applications, lash adjustment mechanisms often must be placed in a visible location on the bike so they may be accessed by an assembler or service technician. Such visible mechanisms impose an aesthetic constraint on motorcycle designers, and may be considered unsightly by motorcycle operators.

Accordingly, it would be desirable to account for mechanical lash in a vehicle cruise control system with minimum cost and complexity, with high reliability, and without adding a design constraint to the vehicle.

SUMMARY OF THE INVENTION

The present invention provides for precise, automated learning of and compensation for any mechanical lash in a cruise control system without use of an adjustment mechanism and without significant additional burden to the assembly process.

More specifically, the cruise control system, including a cruise control actuator coupled to an engine intake air valve through a cable assembly learns the precise amount of system mechanical lash autonomously. Then, to drive an engine intake air valve to a desired position while cruise control is active, a cruise control actuator command corresponding to the desired position is determined and is augmented by the learned mechanical lash before being applied to the actuator so that the desired position may be reached directly with minimum response time.

In accord with a further aspect of this invention, when it is established that mechanical lash learning is required and under controlled operating conditions, the cruise control system operates to slowly draw in the mechanical cable from a known starting position through incremental change in cruise control actuator position. After each incremental change in actuator position, engine operating parameters are monitored for a period of time for any change that would indicate movement of the intake air valve. When a monitored parameter changes in a manner indicating intake air valve movement, the process is halted, and the difference between the known starting position and the last cruise control actuator position that was associated with no movement of the intake air valve is assumed to correspond to the amount of mechanical lash in the system, represented as change in cruise control actuator position away from a starting position. The learned mechanical lash is then stored in controller memory.

In accord with a further aspect of this invention, when cruise control is active, a cruise control actuator command is generated as a function of vehicle speed error. Prior to issuing the command to the cruise control actuator to drive the actuator to a corresponding position, the stored mechanical lash is added to the command to take up the slack in the cruise control system, providing for exact correlation between the position commanded and the intake air valve position reached, regardless of the amount of mechanical lash in any cruise control system.

In accord with yet a further aspect of this invention, the cost and complexity associated with adding sensors to monitor engine parameters is avoided through use of existing sensors to monitor a change in an engine parameter indicative of movement of the intake air valve. Such sensors may include engine speed sensors, mass airflow sensors, intake air pressure sensors or intake air valve position sensors.

In accord with yet a further aspect of this invention, the learning is required during a system initialization period. Still further, additional learning is automatically initiated from time to time as the cruise control system ages, providing for precise lash compensation through-out the life of the system.

BRIEF DESCRIPTION OF THE DRAWINGS

The invention may be best understood by reference to the preferred embodiment and to the drawings in which.

DESCRIPTION OF THE PREFERRED EMBODIMENT

Figure 2:
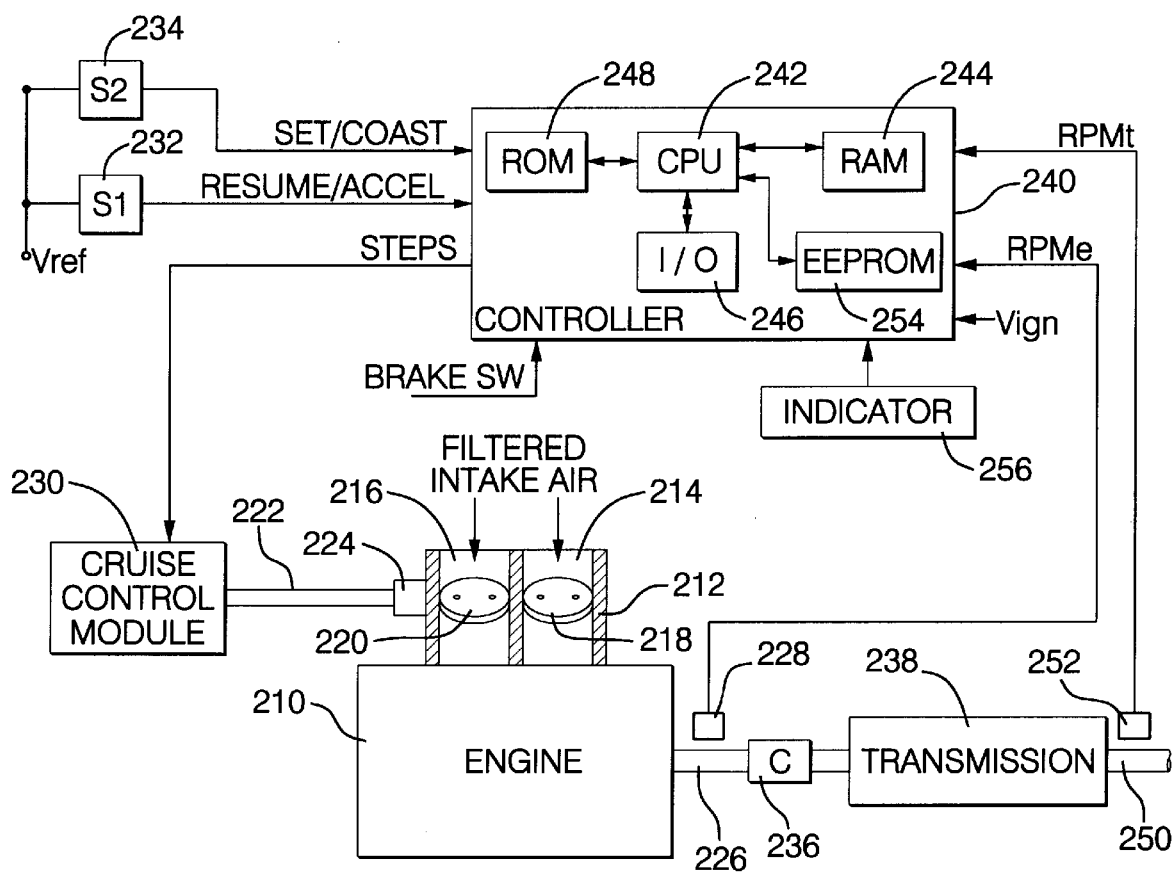
FIG. 2 is a general diagram of the engine and cruise control hardware for carrying out the preferred embodiment of this invention.

Referring to FIG. 2, internal combustion engine 210, such as applied in a motorcycle (not shown), receives filtered intake air through an intake air bore 212 defining first and second intake air passages 214 and 216, each including an intake air valve 218 and 220, respectively, which are manually rotated within their corresponding passage to vary restriction to intake air passing through the passages for mixing with a delivered fuel quantity, the mixture being admitted to engine cylinders (not shown) for combustion therein. Combustion pressure reciprocally drives pistons (not shown) within the cylinders, the pistons being mechanically linked to an engine output shaft 226, such as a crankshaft, for rotating the crankshaft. Spaced teeth or notches (not shown) are disposed about a circumferential portion of the output shaft 226 and a transducer 228 of the Hall effect or variable reluctance type is fixed in position relative to the output shaft 226 to sense passage of the teeth or notches by the sensor 228 and to transduce such passage into output signal RPMe, which is a periodic signal of a frequency proportional to the rate of rotation of engine output shaft 226 (hereinafter referred to as engine speed). Engine output shaft 226 is coupled to a conventional transmission 238 of any suitable type via a conventional clutch mechanism C 236.

The transmission includes an output shaft 250 coupled to one or more driven vehicle wheels (not shown). The gear ratio between the engine output shaft 226 and the transmission output shaft 250 is manually selected by a vehicle operator. Spaced teeth or notches (not shown) are disposed about a circumferential portion of the transmission output shaft 250 and a transducer 252, of the well-known Hall effect or variable reluctance type, is fixed in position relative to the transmission output shaft 250 and is in position to transduce passage of the teeth or notches of the transmission output shaft into output signal RPMt having a frequency proportional to traveling speed of the vehicle in which the engine is installed (hereinafter vehicle speed). Vehicle speed may also be determined as directly proportional to a transduced rate of rotation of one or more vehicle wheels (not shown), such as through any wheel speed sensing hardware generally known in the art.

Cruise control hardware is provided in accordance with this embodiment for automatically controlling, when manually activated by the vehicle operator, vehicle speed to a manually set target speed. Such control is carried out in this embodiment, through engine intake air valve position control, but may be carried out through other means including fuel control and ignition timing control or through any combination of fuel, air, or ignition timing control. The cruise control hardware includes, in this embodiment, a cruise control module 230 which includes a cruise control actuator of the DC stepper motor type (not shown) coupled to a cruise control cable 222 for extending or retracting the cable in response to an actuator control command STEPS issued by controller 240. The actuator control command STEPS is an open-loop position command in the form of a count of motor steps away from a base actuator position. The base actuator position corresponds to a fully extended cable 222 in this embodiment.

As STEPS is increased above a minimum command, such as zero actuator steps, the actuator is rotated to draw in the cable 222 which is mechanically coupled, via standard coupling 224, to the intake air valves 218 and 220. Ideally, a relationship of direct proportionality is present between the magnitude of STEPS and the degree of cable 222 retraction, which translates to a relationship of direct proportionality between the magnitude of STEPS and the amount of intake air valve (218, 220) position offset away from a base position. However, any slack in the cable 222 results in mechanical lash between the actuator of the cruise control module 230 and the intake air vales 218 and 220. Mechanical lash skews the relationship between STEPS and intake air valve position offset, and reduces cruise control response. Mechanical lash is measured and compensated through this invention, as will be described.

Cruise control system control inputs are provided from the vehicle operator through switches S1 232 and S2 234 which may be mechanized in any conventional manner. When switch S1 232 is manually engaged or driven to a predetermined state, such as a short circuit state by a vehicle operator, a reference voltage Vref is passed through to the controller 240 as a signal RESUME/ACCEL indicating, if just temporarily in the predetermined state, a request to return to a cruise control active state at the most recent set speed or, while held in the predetermined state for at least a predetermined time, a request to accelerate at a predetermined acceleration rate. When switch S2 234 is manually engaged or driven to a predetermined state, such as a short circuit state by a vehicle operator, the reference voltage Vref is passed through to the controller 240 as a signal SET/COAST indicating, if just temporarily in the predetermined state, a time to capture the current vehicle speed as a new target speed or, while held in the predetermined state for at least a predetermined time, a request to coast. A signal BRAKESW is provided which, if in a predetermined state, indicates manual braking of the vehicle. Manual braking of the vehicle overrides and defeats the cruise control functions of this embodiment, to be described, as is generally understood in the art.

Controller 240 takes the form of a conventional microprocessor-based microcontroller having such conventional elements as a central processing unit CPU 242 for control, logic, and arithmetic functions, read only memory devices ROM 248 for permanent data and instruction storage, random access memory RAM 244 for read/write temporary data storage, electronically-erasable programmable read only memory EEPROM 254 for read/write data storage which is non-volatile (can be maintained between controller ignition cycles) and input/output circuitry I/O 246 for processing controller input and output signal information. The controller 240 is activated when ignition power Vign is manually applied thereto by the vehicle operator, such as by manually rotating an ignition switch to an "on" position. The controller 240 receives input signals, including the described input signals RPMt, RPMe, SET/COAST, and RESUME/ACCEL, and BRAKESW, and, through execution of a series of program instructions stored in ROM 248, carries out engine control and diagnostic operations, in a step-by-step manner, including the operations of FIGS. 3–5. Indicator 256 takes the form of a lamp visible to the operator or assembler of the engine 210, or a chime audible to the operator or assembler, and is energized and de-energized by the controller 240 through application or removal of a drive signals thereto as is generally understood in the art.

Figure 3:
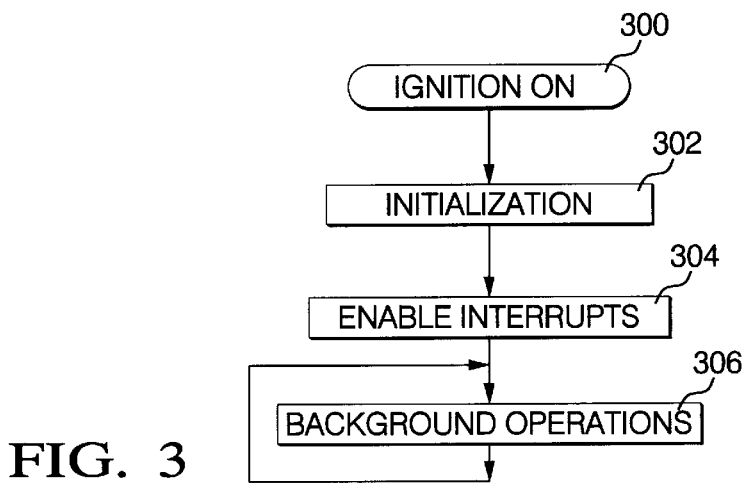
FIGS. 3–5 are computer flow diagrams illustrating a flow of operations for carrying out the mechanical lash learn and compensation operations of the preferred embodiment.

The operations of FIG. 3 are automatically initiated when ignition power is first applied to the controller, such as at the start of each vehicle ignition cycle, beginning at a step 300 and proceeding to carry out general initialization operations at a next step 302. Such initialization operations may include operations to transfer data constants from ROM 248 locations to RAM 244 locations for rapid access, to transfer data constants, including a cruise offset value, from EEPROM 254 locations to RAM locations for rapid access, to set pointers, counters, and flags to initial values, and to carry out other generally understood operations to prepare the controller 240 for operation during the ignition cycle that is just beginning.

A set of timer-based and event-based interrupts are next enabled at a step 304, so that following certain predetermined events or time periods, the interrupts will occur. Each interrupt has associated with it an interrupt service routine which is automatically executed in a step-by-step manner and which is comprised of a sequence of controller operations that are required to be executed on a pre-established time basis or following certain engine events, such as engine cylinder top dead center position events, as is well-established in the art. Included with such interrupts is an interrupt set up to occur for each falling edge of periodic signal RPMe. The service routine for such event-based interrupt (not shown) generates an engine speed value by calculating a time difference between consecutive falling edges of signal RPMe, and by filtering and storing the time difference as representing rate of rotation of engine output shaft 226. Such signal processing for generation of engine speed information is generally known in the art, and may take alternative forms through the exercise of ordinary skill in the art.

Figure 4:
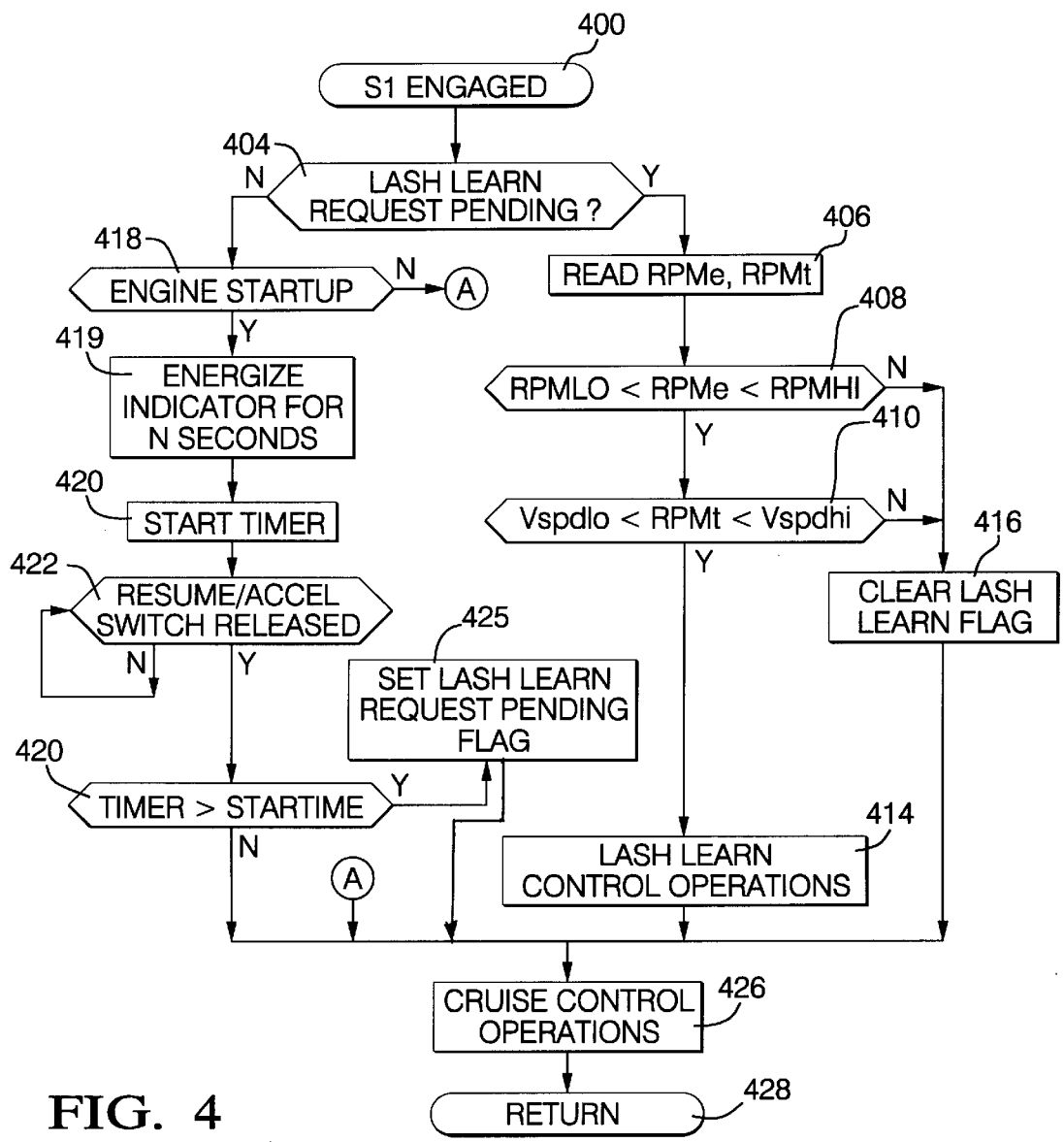

Returning to FIG. 3, after enabling any required interrupts at the step 304, background operations are continuously carried out during the controller ignition cycle, including operations to periodically poll cruise control input signals RESUME/ACCEL and SET/COAST for any change in status, and to execute cruise control routines that are responsive to such status changes. For example, the operations of FIG. 4 are to be executed when the switch S1 is engaged through depression or other manual actuation of the switch S1 to a short circuit state, allowing signal Vref to be passed through to the I/O circuitry 246 of controller 240. In this embodiment, the status of switches S1 and S2 are polled through the background operations about every two hundred to five hundred microseconds. The background operations illustrated by step 306 further include general-understood diagnostic and maintenance operations.

Upon a sensed depression of switch S1 232 (FIG. 2) through the polling operations of step 306, the operations of FIG. 4 are carried out, beginning at a step 400. Generally, the operations of FIG. 4 provide for general cruise control operations that are understood in the art as being required upon depression of a resume/acceleration switch, such as switch S1 of FIG. 2, and further for deliberate retraction of the cable 222 until a cable tension position is reached after which further retraction will result in movement of the engine intake air valves 218 and 220. The amount of required retraction until a cable tension position is reached is then stored and applied throughout an operating period to compensate proactively for cruise cable 222 mechanical lash in accord with an important feature of this invention.

Returning to FIG. 4, after the initial step 400, a lash learn request pending flag is examined at a step 404. The lash learn request pending flag is set when a request for execution of the lash learn operations has been made and is pending. If the lash learn request pending flag is not determined to be set at the step 404, then conditions are analyzed to determine if it indeed should be set, via steps 418–424. Specifically, a check is made at a step 418 to determine if the engine is currently in a startup mode of operation. For example, if the engine is cranking, as indicated by a low, but non-zero engine speed, or if ignition power has just been applied to the controller 240 (FIG. 2), such as less than K seconds prior to the current time, then a startup mode of operation is present, during which mode lash learn operations are set up as available, in this embodiment.

In this embodiment K is set to one, such as the switch S1 must be depressed within one second of application of ignition power to the controller 240 to initiate lash learn operations, such as by engaging S1 232 (FIG. 2) prior to the manual application of ignition power to the controller 240. If the engine is not determined to be in the startup mode at the step 418, lash learn operations are not currently being requested, and the lash learn operations are bypassed by carrying out general cruise control operations required to be executed following any depression of the switch S1 at a next step 426, such as generally understood resume or acceleration operations.

Upon completing execution of such operations for the current depression of switch S1, the operations of FIG. 4 are concluded by returning, via a next step 428, to resume execution of the background operations of step 306 of FIG. 3. If the engine is determined to be in startup mode at the step 418, then the initial depression of switch S1 232 (FIG. 2) is a proper request for lash learn operations, the indicator 256 of FIG. 2 is energized for N seconds at a next step 419 to indicate the initiation of a lash learn request. In this embodiment, N is set to about 5.

After energizing the indicator 256, a timer is started at a next step 420. The timer is provided to time the period that switch S1 is maintained in an engaged position. In this embodiment, S1 must be held in an engaged position for at least a calibrated period of time, such as about five seconds which may be indicated by a de-energization of the indicator 256, and thereafter released, to request lash learn operations. Accordingly, after starting the timer at the step 420, the status of signal RESUME/ACCEL is repeatedly monitored at a next step 422 until the switch S1 232 (FIG. 2) is determined to be released. Once S1 is released, the value of the timer is compared, at a next step 424, to STARTTIME, which is set to a value representing about five seconds in this embodiment. If the timer does not exceed STARTTIME at the step 424, lash learn has not been requested, and the lash learn operations are terminated by proceeding to carry out the described step 426. If the timer does exceed START-TIME at the step 424, a proper lash learn request has been received, and the lash learn request pending flag is set at a step 425. After setting the lash learn request pending flag, the described step 426 is executed.

Returning to step 404, if the lash learn request pending flag is determined to be set, then a complete request for lash learn operations has been received in accord with this embodiment, including engagement of S1 while in an engine startup mode of operation, release of S1 a period of time thereafter that exceeds STARTTIME, and a second depression of switch S1. The inventors intend that any condition or combination of conditions may further be used to invoke the lash learn operations of this embodiment. The specific set of conditions described for this embodiment is but one example of how such operations may be invoked in a simple, reliable, straightforward manner.

In accord with a further embodiment of this invention, the lash learn operations may be periodically carried out, with or without manual intervention by the vehicle operator or assembler, such as at the start of each ignition cycle, as long as learn conditions are met, such as engine speed and vehicle speed being below certain small threshold speeds. Such embodiment provides the benefit of adaptive learning, without operator intervention or inconvenience, of mechanical lash in the cruise control system over time, to accommodate any slight change in cable tension as the cruise system ages, to contribute to high performance cruise system operation over an extended period.

Returning to step 404, if a lash learn request is determined to be pending, lash learn entry conditions are analyzed at steps 406–410. Specifically, engine speed as indicated by signal RPMe and vehicle speed as indicated by signal RPMt are read at a step 406. If engine speed is within a calibrated range bounded by RPMlo of about 500 r.p.m., and RPMhi of about 1500 r.p.m., as determined at a step 408, and vehicle speed, as indicated by signal RPMt is within a calibrated range bounded by Vspdlo representing about 7.5 m.p.h. and Vspdhi representing about twenty m.p.h. at a step 410, then the entry conditions required for lash learn operations are met and lash learn operations are next carried out by proceeding, via a next step 414, to execute the operations of FIG. 5, beginning at a step 500 and proceeding to energize indicator 256 (FIG. 2) at a next step 501 to indicate that lash learn operations are currently underway.

Figure 1:
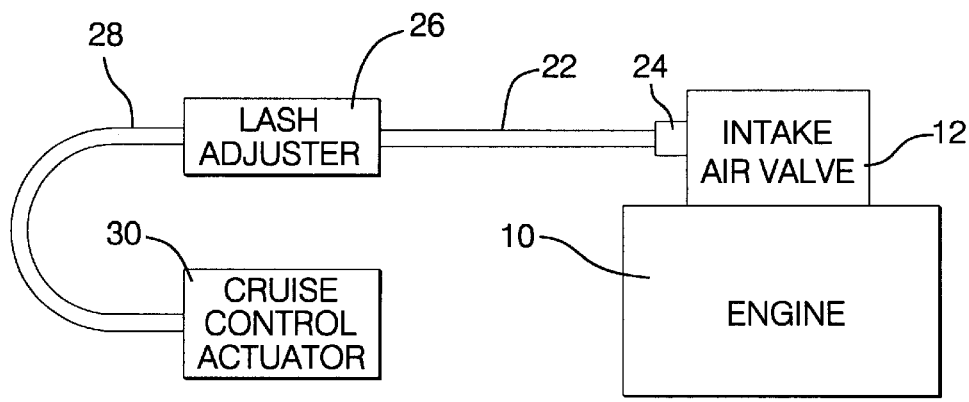
FIG. 1 is a general diagram of a prior art cruise control system including a lash adjustment mechanism.

Following the step 501, a base cruise control command is referenced at a next step 502. The base cruise control command may be calibrated or measured as a base number of motor steps, such as zero steps, corresponding to a cruise cable 222 (FIG. 2) initialization or rest position, and may be stored in EEPROM 254 and transferred to RAM 244 at the described step 302 of FIG. 3. After referencing the base cruise command, a stored value OFFSET is initialized to zero at a next step 504, and is then increased by a calibrated number of motor steps KSTEPS, which is set to one step which normally (without any mechanical lash) corresponds to about 0.4 degrees of intake air valve 218, 220 rotation in this embodiment. Cruise actuator command STEPS is next formulated at a step 508 as a sum of the base cruise command and OFFSET, and is output to the cruise module 230 (FIG. 2) at a next step 510 to drive the cruise actuator to a corresponding position, leading to a small, known amount of retraction of the cruise cable 222 (FIG. 1).

A delay period is next entered at a step 512 to allow any change in the engine operating condition to be substantially realized as a result of the change in cruise actuator position resulting from execution of step 510. In this embodiment, the delay period is set to about 250 milliseconds. Following the delay period, the status of the switch S1 232 of FIG. 2 is checked at a step 514. Switch S1, in this embodiment, is required to be in an engaged position throughout the lash learn process to indicate an operator's continued intent that such process be carried out. If S1 is determined at the step 514 to have been released, the lash learn process is discontinued by proceeding from the step 514 to a next step 532, to be described. If S1 is determined to still be in an engaged position at the step 514, then current engine speed is next determined at a step 516. As described, engine speed is resolved through standard filtering and processing of input signal RPMe.

The determined engine speed is next compared to a prior engine speed measurement, such as the measurement made at the previously executed step 406 of FIG. 4. If the difference between the current engine speed and the prior engine speed exceeds a predetermined threshold value of significant magnitude, for example about two hundred r.p.m. in this embodiment, then it is assumed that the current increase in STEPS caused an increase in the degree of opening of the intake air valves 218 and 220 of FIG. 2, leading to an increase in engine intake air rate and to significantly increased engine speed. Such is assumed to be a result of a taking up of any mechanical lash that may be present in the cruise system including the cruise control module 230, the cruise cable 222, the coupling 224 or the intake air valves 218 and 220. The amount of increase in STEPS above an initial value that is required to take up such lash is valuable for engine cruise control performance, and therefore is stored in accord with this invention after detecting a significant increase in engine speed (via step 518) by proceeding to steps 524 and 526. Specifically, OFFSET is decreased by KSTEPS at step 524 to point to the last value of KSTEPS which was not associated with an increase in engine speed, and the new value of OFFSET is then stored at step 526 in EEPROM 254 and in RAM 244 for a use to be described.

Returning to step 518, if a significant increase in engine speed is not determined to have occurred for the most recent retraction of the cruise actuator, then the value of STEPS is compared to a limit value MAXSTEPS, which is set to about one-hundred steps representing the maximum amount of movement of the cruise actuator that should be required to take up the mechanical lash the cruise control system for a fault-free system. If STEPS is determined to have increased above MAXSTEPS, then it is assumed a fault condition is present in the system which is preventing lash learning, and the lash learn operations are discontinued by proceeding to set OFFSET to zero (or to any suitable value) at a step 522, and to store the OFFSET at the described step 526, and the to execute a step 528, to be described. If STEPS is determined to not be greater than MAXSTEPS at the step 520, then the steps 508–526 are repeated for a slightly greater retraction of the cable 222 (FIG. 2) as represented by OFFSET being incremented by KSTEPS, to continue to slowly take up any mechanical lash in the cruise system, as described.

Figure 5:
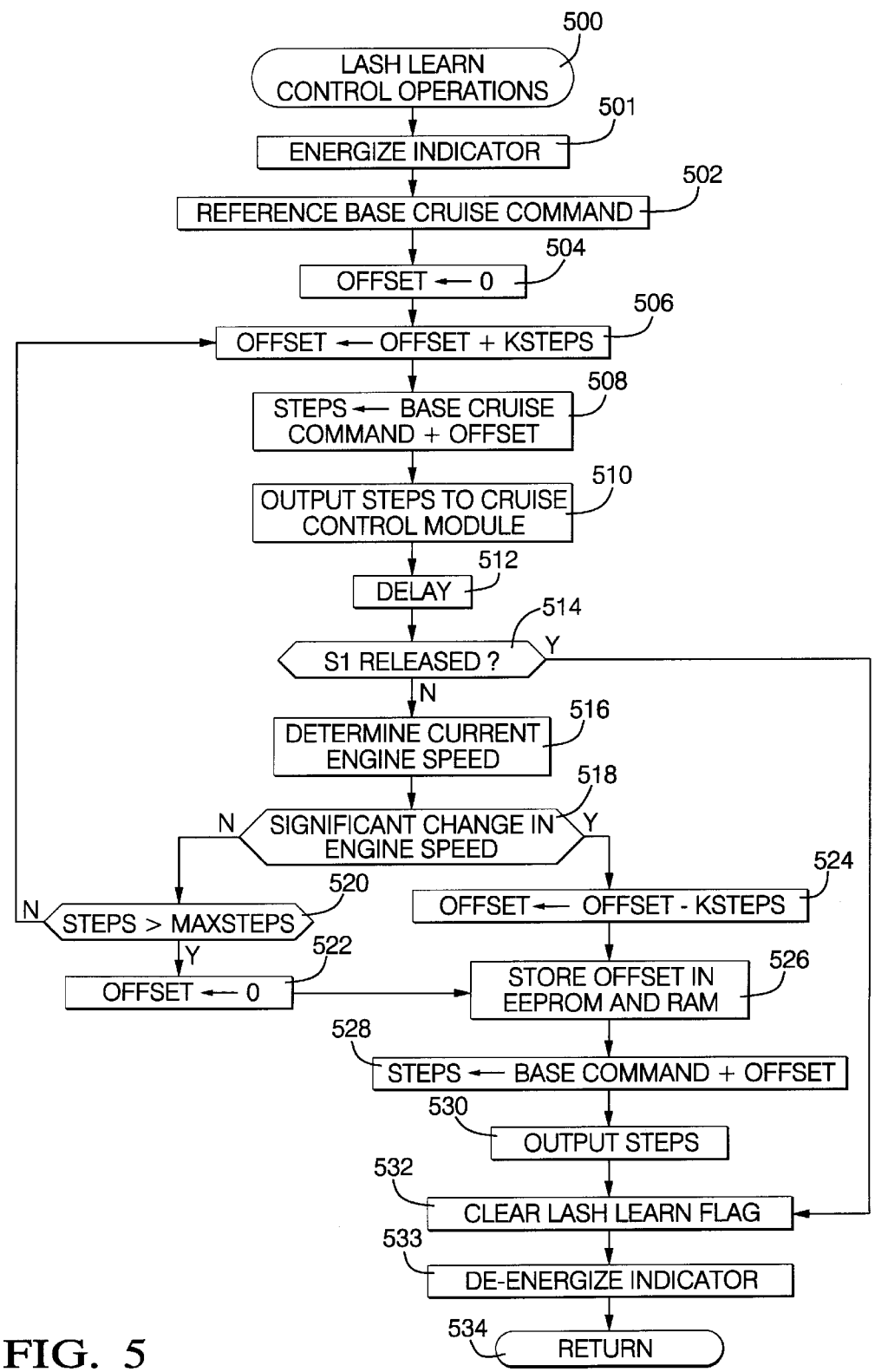

Following the step 526, the command STEPS is reset to its base command plus any OFFSET value assigned through the operations of FIG. 5 at a step 528. STEPS is next output at a step 530 to the cruise control module 230 (FIG. 2) to return the cruise control actuator to its initial position. Next, or is S1 is determined at the step 514 to have been released, the lash learn pending flag is cleared at a step 532 and the indicator 256 (FIG. 2) is next de-energized at a step 533 to mark the end of the lash learn process. The lash learn control operations of FIG. 5 are then concluded by returning, via a next step 534, to the operations of FIG. 4 at the step 414, after which the described step 426 is executed.

The cruise control operations of the step 426 and of any other cruise control routine of a conventional type operating with the lash learn operations of this embodiment, will then add the learned OFFSET to all cruise control actuator commands STEPS to directly account for the learned mechanical lash in the cruise system. OFFSET may be periodically updated, such as by re-enabling the lash learn operations of FIGS. 4 and 5, so that an exact positioning of engine intake air valves may result from any commanded change in cruise actuator position, for improved cruise control performance in accord with a critical aspect of this invention. Following the described step 426, the operations executed in response to engagement of the switch S1 are concluded by returning, via step 428, to execute further of the background operations of step 306 of FIG. 3.

The inventors intend that engine speed is just one of a plurality of parameters that may be monitored to sense a change in intake air valve position resulting from the operations of steps 506–510. Other parameters of the engine which are substantially affected by change in intake air valve position, such as transduced intake air valve position itself from a conventional intake air valve position transducer, or engine intake manifold pressure or engine intake air rate, or indeed any conventionally measured engine parameter affected by a change in engine intake air valve position may be substituted in place of engine speed at the steps 514–518 (FIG. 5) to sense change in intake air valve position in accord with this invention.

The preferred embodiment is not intended to limit or restrict the invention since many modifications may be made through the exercise of ordinary skill in the art without departing from the scope of the invention.

The embodiments of the invention in which a property or privilege is claimed are described as follows:

1. A method for controlling traveling speed of a vehicle driven by an engine by controlling restriction to engine intake airflow to vary engine output torque, the vehicle including an actuator coupled to an engine intake air valve through a cable assembly for translating change in actuator position into change in an airflow restriction position of the intake air valve, the cable assembly having a mechanical lash condition characterized by an actuator position range over which change in actuator position does not translate into change in an airflow restriction position of the intake air valve, the method comprising the steps of:

determining when mechanical lash measurement is required;

when mechanical lash measurement is determined to be required, controlling the actuator position to a predetermined initial position;

varying actuator position in accordance with a predetermined position change schedule;

monitoring an engine operating parameter that is responsive to change in engine intake airflow restriction while varying the actuator position to detect any significant change in the operating parameter;

when a significant change in the operating parameter is detected, storing a mechanical lash value as a function of a difference between the initial actuator position and a current actuator position;

applying the stored mechanical lash value to a base actuator control command to correct the base actuator control command; and controlling the position of the actuator in accordance with the corrected base actuator control command.

2. The method of claim 1, further comprising the steps of:
sensing a request for automatic speed control;
referencing a target vehicle speed;
sampling an input signal indicating current vehicle speed;
determining vehicle speed error as a difference between the current vehicle speed and the target vehicle speed; and
generating the base actuator control command as a function of the determined vehicle speed error.

3. The method of claim 1, wherein the step of determining when lash learning is required comprises the steps of:
sensing a control initialization period;
determining lash learning to be required upon sensing the control initialization period.

4. The method of claim 3, wherein the control initialization period is sensed at a start of each vehicle ignition cycle.

5. The method of claim 1, wherein the engine operating parameter is engine speed.

6. The method of claim 1, the engine including an intake manifold for receiving the intake air, wherein the engine operating parameter is engine intake manifold air pressure.

7. The method of claim 1, wherein the engine operating parameter is engine intake airflow rate.

8. The method of claim 1, wherein the storing step comprises the steps of:
determining a current actuator position;
decreasing the current actuator position by a predetermined position step and by the initial position to form a position offset representing the mechanical lash; and
storing the position offset.

9. In an engine-driven transportation vehicle having a cruise control system for controlling engine output torque by modulating engine intake air rate to drive vehicle speed toward a target speed, the cruise control system including a cruise control actuator mechanically linked, by a cable mechanism, to an engine intake air valve whereby cruise control actuator position change is translated into corresponding change in an engine intake airflow restriction position of the intake air valve, the cruise control system having mechanical lash characterized by a lack of correspondence between cruise control actuator position change and change in an engine airflow restriction position of the intake air valve over a cruise control actuator position range, comprising the steps of:

sensing a request for learning of the cruise control actuator position range;

orienting the cruise control actuator in a start position upon sensing the request;

sampling an input signal indicating an initial value of an engine parameter corresponding to the start position of the cruise control actuator, the engine parameter being responsive to change in the airflow restriction position of the intake air valve;

learning the cruise control actuator position range over a learn period, by repeatedly, (a) increasing the position of the cruise control actuator by a position step value, (b) monitoring the engine parameter, (c) comparing the current value of the monitored parameter to the initial value, (d) detecting a significant difference between the initial and current values of the engine parameter, and (e) terminating the learn period when the significant difference is detected;

calculating the cruise control actuator position range as a function of a difference between the position of the cruise control actuator when the learn period is terminated and the start position of the cruise control actuator;

generating a cruise control actuator control command as a function of a base command and of the calculated cruise control actuator position range; and controlling the cruise control actuator in accordance with the generated cruise control actuator control command.

10. The method of claim 9, wherein the generating step further comprises the steps of:

sampling an input signal indicating current vehicle speed;

calculating vehicle speed error as a function of a difference between current vehicle speed and the target vehicle speed; and determining the base command as a function of the vehicle speed error.

11. The method of claim 9, wherein the calculating step calculates the cruise control actuator position range by subtracting the start position and the position step value from the position of the cruise control actuator when the learn period is terminated.

12. The method of claim 9, wherein the engine parameter is a predetermined one of engine speed, engine intake airflow rate, engine intake air pressure, and engine intake air valve restriction position.

13. A automatic speed control method for a vehicle, for controlling output torque of an engine of the vehicle by varying an engine intake air valve restriction position through control of the position of an actuator coupled, through a cable assembly, to the intake air valve, the cable assembly for translating change in actuator position into change in engine intake air valve restriction position, wherein mechanical lash is present between the actuator and the valve characterized by an actuator position range over which change in actuator position does not translate into change in the intake air valve restriction position, comprising the steps of:

initiating a mechanical lash learn procedure for determining the actuator position range, by (a) resetting the actuator to an initial position, (b) determining an initial value of an engine parameter responsive to change in the intake air valve restriction position, the initial value of the engine parameter corresponding to the initial position of the actuator, (c) increasing the actuator position by a predetermined increase amount, (d) determining a current value of the engine parameter corresponding to the increased actuator position, (e) comparing the determined current value to the initial value of the engine parameter, (f) terminating the lash learn procedure if the determined current value is significantly different than the initial value of the engine parameter, and (g) repeating the increasing, determining and comparing steps if the determined current value is not significantly different than the initial value of the engine parameter;

upon terminating the lash learn procedure, calculating the position range as a function of a difference between the actuator position when the lash learn procedure was terminated and the initial position of the actuator;

generating a base actuator position command;

adjusting the base actuator position command by the calculated position range; and controlling the position of the actuator in accordance with the adjusted base actuator position.

14. The method of claim 13, wherein the calculating step further comprises the steps of:

determining a difference value representing a difference between the position of the actuator when the lash learn procedure was terminated and the predetermined increase amount; and calculating the position range as a difference between the difference value and the initial position of the actuator.

15. The method of claim 13, wherein the step of generating a base actuator position command comprises the steps of:

sampling an input signal indicating current vehicle speed;

determining vehicle speed error as a difference between current vehicle speed and the target vehicle speed; and generating the base position command as a function of the vehicle speed error.

16. The method of claim 13, wherein the engine parameter is a predetermined one of engine speed, engine intake airflow rate, engine intake air pressure, and engine intake air valve restriction position.

* * * * *